July 22, 1941.  E. JESCHKE  2,250,128
COOKY FORMING AND CUTTING MACHINE
Filed Dec. 5, 1940  3 Sheets-Sheet 1
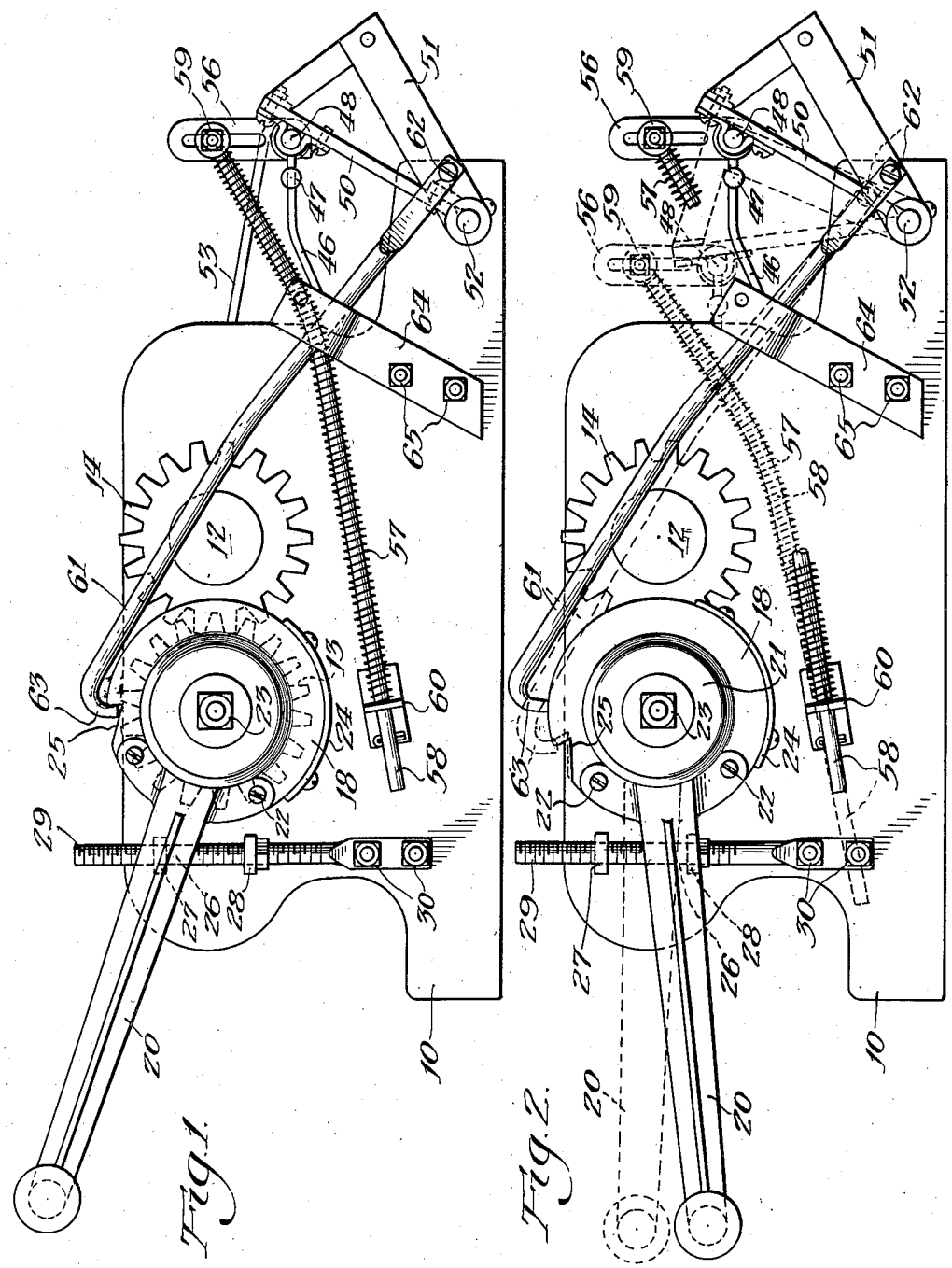
Inventor:
Ernest Jeschke,
By: Bertha L. MacGregor
Attorney.

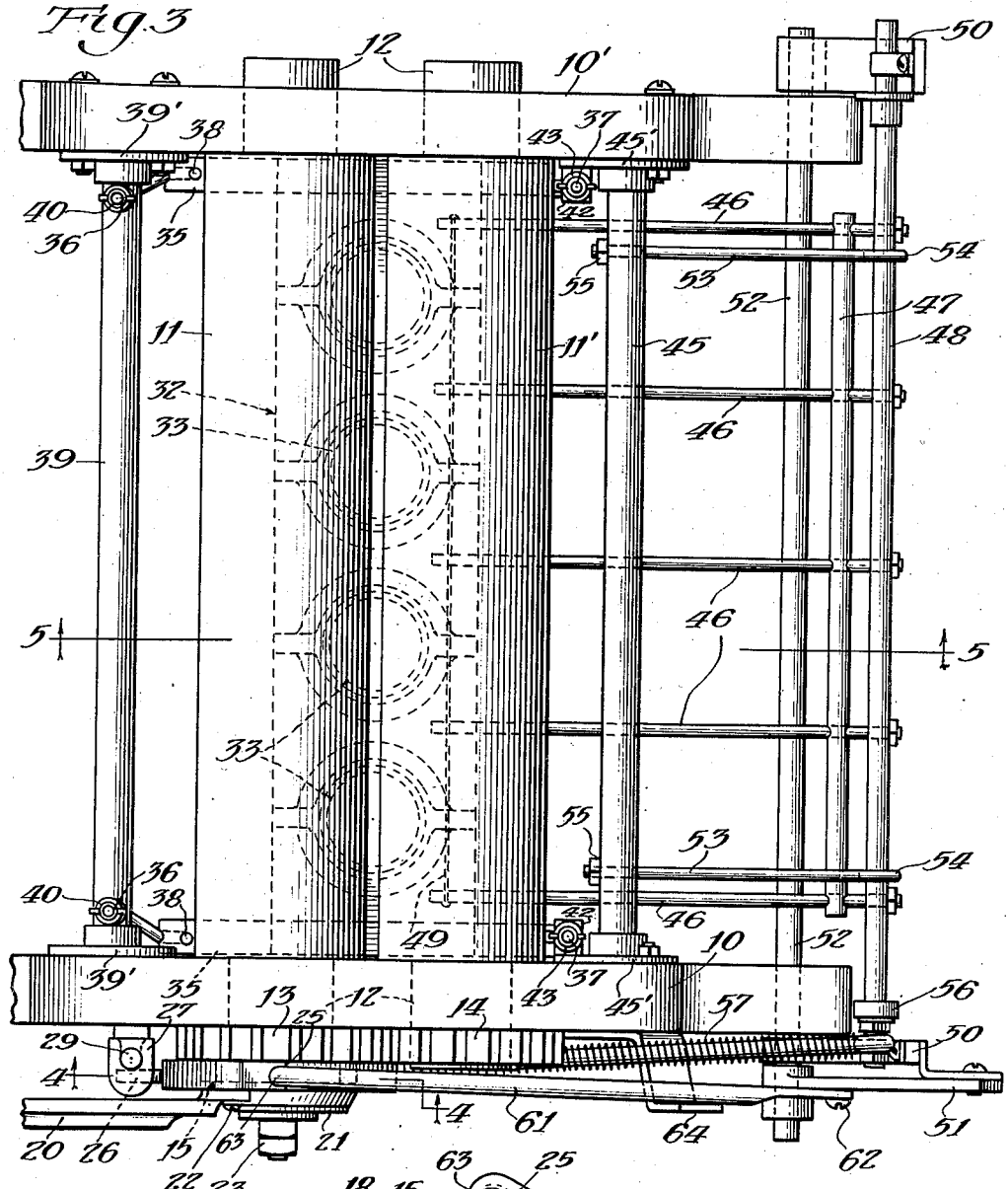
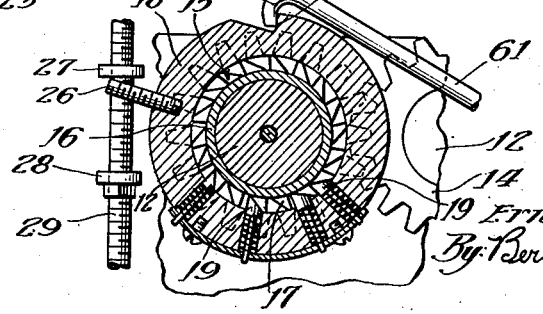

July 22, 1941.  E. JESCHKE  2,250,128
COOKY FORMING AND CUTTING MACHINE
Filed Dec. 5, 1940  3 Sheets-Sheet 3
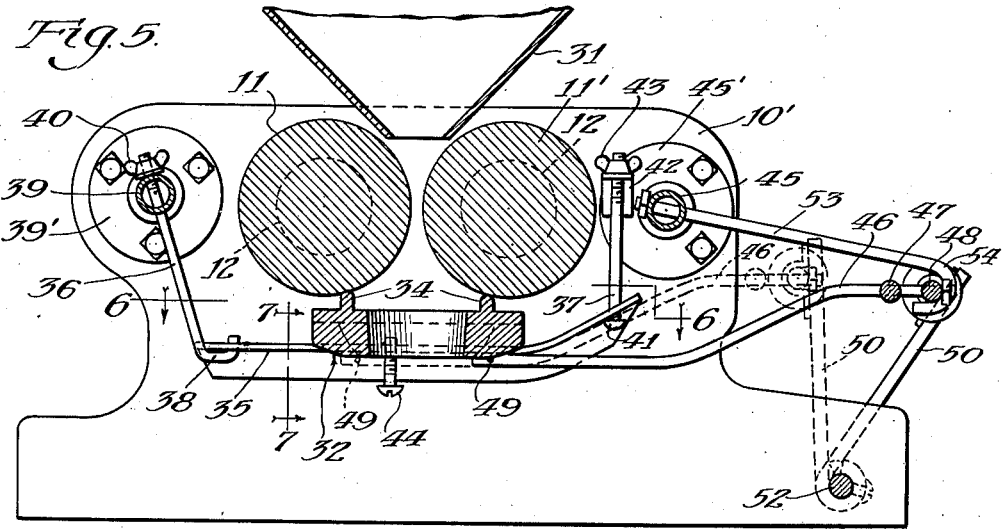
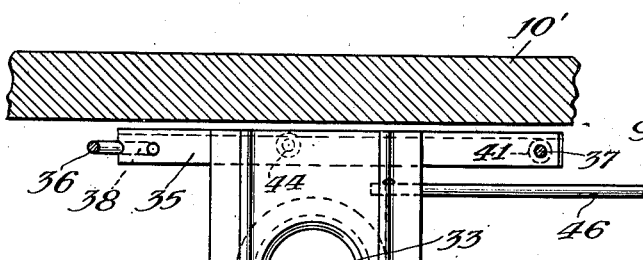
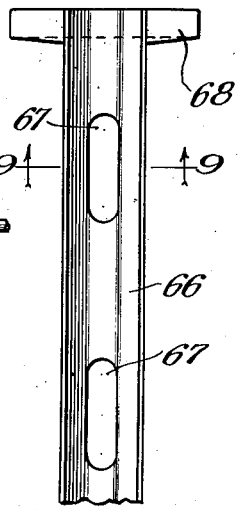
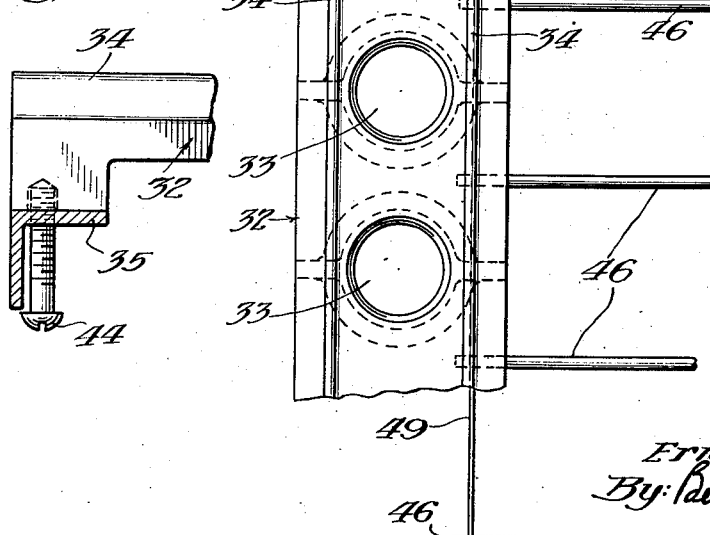
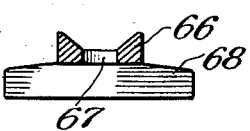
Inventor:
Ernest Jeschke,
By: Bertha L. MacGregor
Attorney.

Patented July 22, 1941

2,250,128

UNITED STATES PATENT OFFICE 2,250,128

COOKY FORMING AND CUTTING MACHINE

Ernest Jeschke, Chicago, Ill., assignor of one-half to Nick Thomas, Chicago, Ill.

Application December 5, 1940, Serial No. 368,637

8 Claims. (Cl. 107—27)

This invention relates to cooky forming and cutting machines, and particularly to a machine capable of producing sliced or cut cookies of various shapes and thicknesses and also strip cookies.

One of the objects of the invention is to produce a machine having easily adjustable means for determining the thickness of the cookies produced thereby, said means providing finely graduated adjustments within a wide range.

Another object is to provide a machine in which a single operating handle actuates the dough feeding mechanism and the cutting mechanism.

Another object is to provide means for interchanging and mounting different dies used for forming cookies, said means being located so as to be easily accessible to the operator.

In the drawings:

Fig. 1 is a side elevational view of a cooky forming and cutting machine embodying my invention.

Fig. 2 is a view similar to Fig. 1, showing in full and dotted lines, respectively, two positions of the actuating handle and the mechanism for moving the cutter and its frame.

Fig. 3 is a plan view of the machine.

Fig. 4 is a vertical sectional view taken in the plane of the line 4—4 of Fig. 3.

Fig. 5 is a vertical sectional view taken in the plane of the line 5—5 of Fig. 3.

Fig. 6 is a horizontal sectional view taken in the plane of the line 6—6 of Fig. 5.

Fig. 7 is a vertical sectional view, on an enlarged scale, taken in the plane of the line 7—7 of Fig. 5.

Fig. 8 is a plan view of part of a forming die which can be interchanged with the one shown in Fig. 6.

Fig. 9 is a vertical sectional view taken in the plane of the line 9—9 of Fig. 8.

In that embodiment of the invention shown in the drawings, a pair of spaced apart, vertical side members 10, 10' support the rolls 11, 11' between them, said rolls having hubs 12 of reduced diameter, rotatably mounted in said side members 10, 10'. At one side of the machine, said hubs 12 have fixedly mounted thereon, outwardly of the side member 10, a pair of gears 13, 14 in mesh with each other, so that when one roll is driven in one direction, the other roll will rotate in the opposite direction.

A ratchet device indicated as a whole at 15 is also mounted on the hub 12 of the roll 11 on which the gear 13 is mounted. The ratchet comprises an inner ring 16 having teeth 17 on its periphery, an outer ring 18 in which are mounted spring pressed detents 19. The inner ring 16 is integral with or is fixed to the gear 13 in any suitable manner. An actuating lever 20 is mounted on the outer ring and is secured thereto as indicated at 22. A disc 21 retains the ring 18 by means of the nut and bolt 23 against the gear 13 and inner ring 16 of the ratchet. A plate 24 retains the detents 19 in position in the ring 18.

When the actuating lever 20 is moved clockwise, the outer ring 18 of the ratchet also moves clockwise and the detents 19 engage the teeth 17 of the inner ring 16, locking the rings together and thereby causing the gear 13 and roll 11 to be rotated clockwise. The roll 11' will be rotated counter-clockwise by the meshing of the gear 14 with the driven gear 13. When the actuating lever 20 is moved counter-clockwise, the outer ring 18 of the ratchet slips over the toothed inner ring and no movement is imparted to the gear 13 or roll 11.

On the periphery of the outer ring 18 is a notch which forms a tooth 25 for a purpose to be explained. A stop pin 26 is removably positioned in the periphery of the outer ring 18 limiting the movement of said ring between a pair of stops 27, 28 adjustably positioned on a screw threaded rod 29 mounted fixedly on the side member 10 by bolts 30. The stops 27, 28 control the extent of rotative movement of the ratchet 15 and consequently control the dough feeding movement of the rolls 11, 11', between which dough is fed from a hopper 31.

Closely beneath the rolls 11, 11' is a forming die indicated as a whole at 32. As shown in Figs. 5 and 6, the die is provided with round holes 33 through which the dough passes, the ribs 34 confining the dough as intended. The die is detachably mounted by means of a pair of angle rails 35, 35 mounted adjacent the inner surfaces of the side members 10, 10', by bolts 36 and 37. The bolt 36 has a hook end 38 which engages one end of the rail 35. The upper end of the bolt 36 extends through a rod or bar 39 and is adjustably secured in position by a wing nut 40. The bolt 37 has a head 41 which retains the rail 35, and the free end of the bolt 37 extends through a support 42 on the side member and is adjustably secured by a wing nut 43. Usually only the bolt 36 need be detached to allow the rail 35 to be lowered at one end sufficiently to remove the die 32 for cleaning purposes or for interchanging dies. The rails are bent upwardly near one end, as shown in Fig. 5, which aids in positioning the die 32. A screw 44 which extends through the rail 35 and into a recess in the die 32 at each end serves to hold the die stationary in use, as shown in Figs. 5 and 7.

A rod or bar 45 similar to the rod or bar 39 extends between the side members 10, 10′, and said bars 39 and 45 are firmly secured to the side members by plates 39′ and 45′ bolted to said members, and provide a strong frame for the rolls, die and operating mechanism.

The cooky cutting means (Figs. 3 and 5) comprises a cutter frame consisting of a series of rods 46, connected together by cross rods 47, 48, near one end. A cutter wire 49 is connected to said rods 46 at their other ends. The cross rod 48 is pivotally mounted at its ends in a pair of levers 50, reinforced by an L-shaped member 51.

Each lever 50 at its lower end is pivotally mounted on a shaft 52 which extends through the side members 10, 10′, near the bottom of said side members. Pivotal movement of the lever 50—51 transmits horizontal movement to the cutter wire 49 across the lower face of the die 32 as will be more fully explained hereinafter. A pair of cutter frame stops 53, having hook ends 54, are attached to the rod 45 by any suitable means 55, the hook ends 54 being adapted to engage the cross rod 48 of the cutter frame in one of its positions.

A slotted bracket 56 extends rigidly upwardly, as best shown in Figs. 1 and 2, from one end of the cross rod 48. A coiled spring 57 surrounding a rod 58 is attached at one end to the bracket 56 by any suitable means 59. At its other end, the spring bears against an apertured plate 60 secured to the side member 10. The rod 58 is also attached to the bracket 56 and at its free end extends through the aperture in the plate 60 to a greater or lesser extent, depending on the position of the cutter frame and bracket 56.

A lever or pawl 61 is pivotally connected at 62 to the part 51 of the lever 50. Its hooked end 63 is adapted to engage the tooth 25 of the ring 18. The pawl 61 is retained or guided by a bent arm 64 attached to the side member 10 as indicated at 65 (Figs. 1, 2 and 3).

In Figs. 8 and 9, I have shown a modified form of die 66 adapted for producing strip cookies. It has openings 67 corresponding to the vertical cross section of the strip to be produced. The end construction 68 and the dimensions of the die 66 are such that said die can be interchanged with the die 32 and be mounted on the rails 35. It will be understood that the apertures 33 in the die 32 correspond with the horizontal cross section of the cookies cut from the dough which passes through said openings.

The operation of the machine is as follows: Assuming the die 32 is in proper position on the rails 35, the stops 27 and 28 are adjusted on the rod 29 according to the thickness of cookies desired, and dough is placed in the hopper 31 above the rolls 11, 11′. We will assume that dough has been passed downwardly between the rolls so that it is ready to emerge from the openings 33 in the die 32. Then the actuating lever 20 is moved upwardly, that is, rotated clockwise, thereby rotating the ratchet members 18 and 16 together, as well as the gear 13 which drives the gear 14, and their respective rolls 11, 11′. The lever 20 can be moved only to the extent permitted by the stops 27 and 28 between which is confined the stop pin 26 on the ratchet ring 18. This movement of the rolls causes a proper amount of dough to pass through the openings 33 in the die.

When the actuating lever 20 has been moved upwardly to the limit of its movement, as in Fig. 1, the end 63 of the lever 61 will fall into the notch which forms the tooth 25 on the ring 18. Then the actuating lever 20 is moved downwardly, counter-clockwise, and the lever 20 rotates the outer ring 18 with it, causing the lever 61 (engaged by the ratchet tooth 25) to be pulled toward the left, from the position shown in Fig. 1 to the dotted line position of Fig. 2. The lever 61 draws the pivotally mounted lever 50—51 toward the left, as shown in Fig. 2, and this action accomplishes two things. It compresses the spring 57 between the bracket 56 and the fixed plate 60. It also moves the cutter frame 46—48 to the left so that the cutter wire 49 passes across the bottom of the die 32 as shown in Fig. 5, cutting the dough into flat cookies having the horizontal cross section of the openings 33.

When the actuating lever 20 has been moved downwardly to the dotted line position of Fig. 2, the lever 61 begins to release from the tooth 25 and a slight further counter-clockwise movement completes the release and then the spring 57 expands and moves the lever 50—51 and connected cutter frame 46—48 to the right, that is, the initial position shown in Fig. 1.

It will be understood from the foregoing that only two actuations of the lever 20 are necessary for each cycle of operations: limited movement in a clockwise direction to drive the rolls and feed dough through the die 32, and reverse movement of the lever 20 for cutting the dough and restoring the cutter frame and other parts to initial position.

It will also be understood that the connection 59 between the spring 57 and the bracket 56 is adjustable and this arrangement serves to vary the cutting relationship between the cutting wire and the bottom of the die. Adjustment of the connection 59 will always keep the cutting wire in correct position.

When it is desired to produce strip cookies, the die 66 is substituted for the die 32, and the stop pin 26 is removed from the ratchet ring 18. The pin 26 can be mounted in the arm 64 in such position that it serves as a support for holding the lever 61 out of engagement with the tooth 25 of the ratchet ring 18. Then the lever 20 can be rotated clockwise without being limited by the stops 27 and 28, and the cutting mechanism will be inoperative. Dough will be fed in long strips through the die 66 and the strips may fall directly into baking pans which may be moved between the side members 10, 10′ beneath the die 66.

Changes may be made in details of construction without departing from the scope of my invention.

I claim:

1. A cooky forming and cutting machine comprising a pair of rotatably mounted rolls, a die, means removably mounting said die beneath the rolls, a cutter, an actuating lever, means on one of the rolls operatively connected with the cutter and operable by the actuating lever when moved in one direction to rotate the rolls to move dough downwardly between them, and operable by said actuating lever when moved in the opposite direction to move said cutter across the face of the die without rotation of said rolls, and means automatically operable at the ends of the cutting operation returning said cutter to initial position.

2. The construction set forth in claim 1, in which the means for mounting the die comprises a frame in which the rolls are mounted, a pair of rails, and means connected to said frame and accessible from above the rolls for suspending said rails in die supporting position beneath the rolls.

3. The construction set forth in claim 1, which includes a frame in which the rolls are mounted and a pair of stops movably mounted on the frame adjacent the actuating lever limiting the extent of movement of the lever and the rotation of said rolls.

4. A cooky forming and cutting machine comprising a pair of spaced supports, rolls rotatably mounted in said supports, a die mounted on the supports beneath the rolls, a cutter, a pair of levers pivotally connected to the supports, said cutter being pivotally connected at one end to said levers, an actuating lever, meshing gears on said rolls, ratchet means on one of the gears, a lever intermittently connecting said ratchet means to a cutter lever, said ratchet means being operable by the actuating lever when moved in one direction to rotate the rolls to move dough downwardly between them, and operable by said actuating lever when moved in the opposite direction to move the cutter across the face of the die without rotation of said rolls, and means automatically operable at the end of the cutting operation returning said cutter to initial position.

5. The construction set forth in claim 4, in which the ratchet means comprises an inner toothed ring connected to the gear on one of the rolls, an outer ring having spring pressed detents operable to lock the rings together when moved in one direction, the actuating lever being connected to the outer ring, and a tooth on the periphery of the outer ring adapted to engage the lever which operatively connects the ratchet means to one of the cutter levers.

6. A cooky forming and cutting machine comprising a pair of spaced supports, rolls rotatably mounted in said supports, a die mounted on the supports beneath the rolls, a cutter, a pair of levers pivotally connected to the supports, said cutter being pivotally connected at one end to said levers, an actuating lever, meshing gears on said rolls, ratchet means on one of the gears, a lever intermittently connecting said ratchet means to a cutter lever, said ratchet means being operable by the actuating lever when moved in one direction to rotate the rolls to move dough downwardly between them, and operable by said actuating lever when moved in the opposite direction to move the cutter across the face of the die without rotation of said rolls, and means automatically operable at the end of the cutting operation returning said cutter to initial position, said last mentioned means comprising a rod surrounded by a spring, said rod and spring being connected at one end to the cutter, and an apertured fixed support through which said rod is movable and which restrains the spring when it is being compressed by the movement of the cutter.

7. A cooky forming and cutting machine comprising a pair of spaced supports, rolls rotatably mounted in said supports, a die mounted on the supports beneath the rolls, a cutter, a pair of levers pivotally connected to the supports, said cutter being pivotally connected at one end to said levers, an actuating lever, meshing gears on said rolls, ratchet means on one of the gears, a lever intermittently connecting said ratchet means to a cutter lever, a pair of adjustable stops on the support adjacent the ratchet means, a removable stop pin in the ratchet movable between said stops, said ratchet comprising an inner toothed ring connected to the gear on one of the rolls, and an outer ring provided with means for engaging the toothed ring to lock the rings together, said actuating lever being connected to the outer ring, said ratchet means being operable by the actuating lever when moved in one direction to rotate the rolls to move dough downwardly between them, and operable by said actuating lever when moved in the opposite direction to move the cutter across the face of the die without rotation of said rolls, and means automatically operable at the end of the cutting operation returning said cutter to initial position.

8. The construction set forth in claim 7, in which the stop pin is removable from the ratchet and the lever which intermittently connects the ratchet means to a cutter lever is movable to nonconnecting position.

ERNEST JESCHKE.